United States Patent [19]
Kunde

[11] Patent Number: 4,988,805
[45] Date of Patent: Jan. 29, 1991

[54] NAPHTHOLAZO-PHENYLAZOAMINONAPHTHOL COMPOUNDS AND COPPER COMPLEXES THEREOF

[75] Inventor: Klaus Kunde, Neunkirchen, Fed. Rep. of Germany

[73] Assignee: Bayer Aktiengesellschaft, Leverkusen, Fed. Rep. of Germany

[21] Appl. No.: 219,108

[22] Filed: Jul. 14, 1988

[30] Foreign Application Priority Data

Jul. 29, 1987 [DE] Fed. Rep. of Germany ....... 3725082

[51] Int. Cl.⁵ ............... C09B 35/024; C09B 35/037; C09B 45/28; D06P 3/60; D06P 5/00; D21H 21/28
[52] U.S. Cl. ................... 534/717; 534/582; 534/602; 534/613; 534/614; 534/693; 534/716; 534/728; 534/829; 534/835; 534/872; 534/876; 534/887
[58] Field of Search ............ 534/721, 723, 725, 835, 534/716, 717, 836, 829; 430/561, 562, 563

[56] References Cited

U.S. PATENT DOCUMENTS

| | | | |
|---|---|---|---|
| 1,079,415 | 11/1913 | Kalischer | 534/835 |
| 1,784,343 | 12/1930 | Fellmer | 534/835 |
| 2,612,496 | 9/1952 | Gaspar et al. | 430/563 X |
| 3,157,508 | 11/1964 | Dreyfuss | 430/563 |
| 3,671,253 | 6/1972 | Froehlich et al. | 430/563 |
| 3,782,948 | 1/1974 | Froehlich et al. | 430/561 |
| 4,051,123 | 9/1977 | Piller et al. | 534/797 X |

FOREIGN PATENT DOCUMENTS

| | | | |
|---|---|---|---|
| 475026 | 7/1951 | Canada | 534/835 |
| 57-145155 | 9/1982 | Japan | 534/716 |
| 315400 | 10/1930 | United Kingdom | 534/725 |
| 1176898 | 1/1970 | United Kingdom | 534/835 |

OTHER PUBLICATIONS

Colour-Chem Ltd., Chemical Abstracts, vol. 94, Abstract No. 32169u, 1981.
Jaeger, Chemical Abstracts, vol. 94, Abstract No. 193699g, 1981.
Kraemer et al., Chemical Abstracts, vol. 78, Abstract No. 85900b, 1973.
Sandoz, Chemical Abstracts, vol. 101, Abstract No. 153475n, 1984.

Primary Examiner—Floyd D. Higel
Assistant Examiner—Fiona T. Powers
Attorney, Agent, or Firm—Sprung Horn Kramer & Woods

[57] ABSTRACT

The dyestuffs of the general formulae

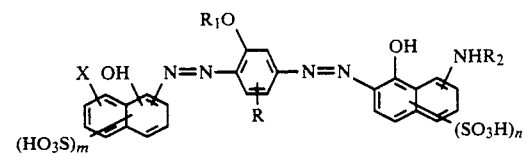

and

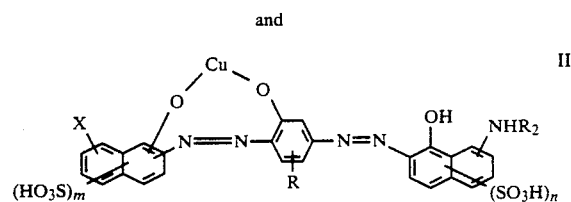

and salts thereof
wherein
X denotes hydrogen, alkoxy or NHR₃,
R denotes hydrogen, alkyl or alkoxy,
R₁ denotes alkyl,
R₂ and R₃ denote hydrogen, alkyl, alkylcarbonyl, alkylsulphonyl, aryl, arylcarbonyl, arylsulphonyl, aralkyl, aralkylcarbonyl or aminocarbonyl and
m and n denote 1 or 2, and wherein the substituents mentioned can, in turn, be substituted by nonionic radicals or carboxylic or sulphonic acid groups customary in dyestuffs chemistry, are used for dyeing cellulose-containing materials and leather.

4 Claims, No Drawings

NAPHTHOLAZOPHENYLAZOAMINONAPHTHOL COMPOUNDS AND COPPER COMPLEXES THEREOF

The invention relates to a process for dyeing cellulose-containing materials and leather with dyestuffs of the general formulae

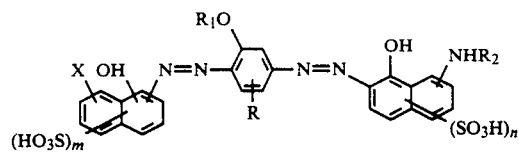

and salts thereof
wherein
X denotes hydrogen, alkoxy or NHR$_3$,
R denotes hydrogen, alkyl or alkoxy,
R$_1$ denotes alkyl,
R$_2$ and R$_3$ denote hydrogen, alkyl, alkylcarbonyl, alkylsulphonyl, aryl, arylcarbonyl, arylsulphonyl, aralkyl, aralkylcarbonyl or aminocarbonyl and
m and n denote 1 or 2, and
wherein the substituents mentioned can, in turn, be substituted by nonionic radicals or carboxylic and sulphonic acid groups customary in dyestuffs chemistry.

In formulae (I) and (II) aryl is preferably understood to mean phenyl and aralkyl is preferably understood to mean benzyl.

Examples of nonionic radicals are halogen, hydroxyl, C$_1$-C$_4$-alkoxy, acetoxy and, in the case of aryl radicals also C$_1$-C$_4$-alkyl.

In a preferred process, dyestuffs of the general formulae

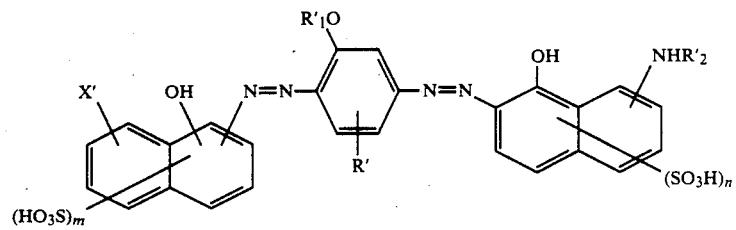

and

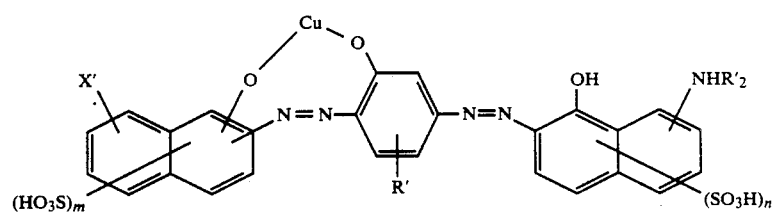

wherein
R' denotes hydrogen, C$_1$-C$_4$-alkyl or C$_1$-C$_4$-alkoxy,
R'$_1$ denotes C$_1$-C$_4$-alkyl,
X' denotes hydrogen, C$_1$-C$_2$-alkoxy or NHR'$_3$,
R'$_2$ and R'$_3$ denote hydrogen, C$_1$-C$_4$-alkyl, C$_1$-C$_4$-alkylcarbonyl, C$_1$-C$_4$-alkylsulphonyl, phenylcarbonyl, phenylsulphonyl or benzylcarbonyl in which the phenyl radicals can be substituted by SO$_3$H or COOH, or denote aminocarbonyl and m and n denote 1 or 2, and the sum of m and n is 3, are used.

The invention also relates to dyestuffs of the general formulae

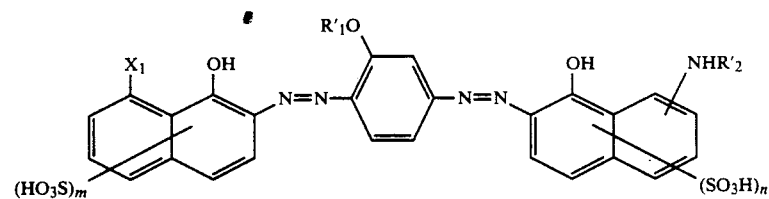

and

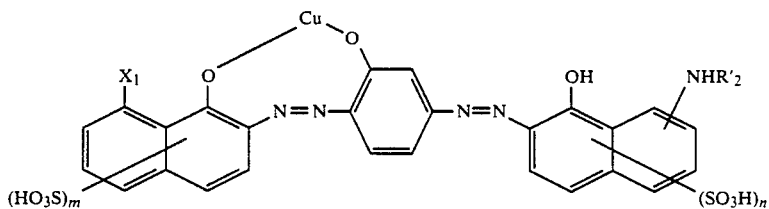
VI and salts thereof
wherein
$X_1$ denotes hydrogen or $C_1$–$C_4$-alkoxy and
$R'_1$, $R'_2$, m and n have the meaning mentioned, and to processes for dyeing cellulose-containing materials and leather with these dyestuffs.

The preparation of the dyestuffs (I) and (II) is effected by diazotizing compounds of the general formula

VII coupling the product with compounds of the general formula

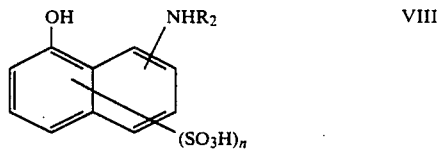
VIII and, if appropriate, treating the product with copper-(II) salts.

Dyestuffs of the formulae (V) and (VI) which are preferred are those of the formulae

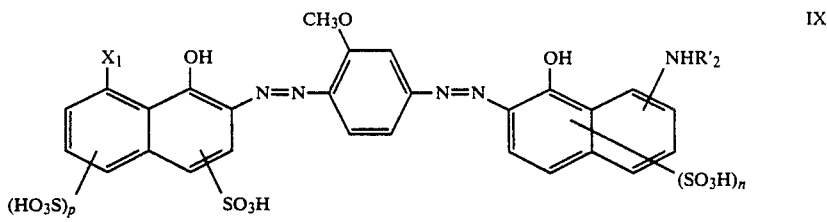
IX and

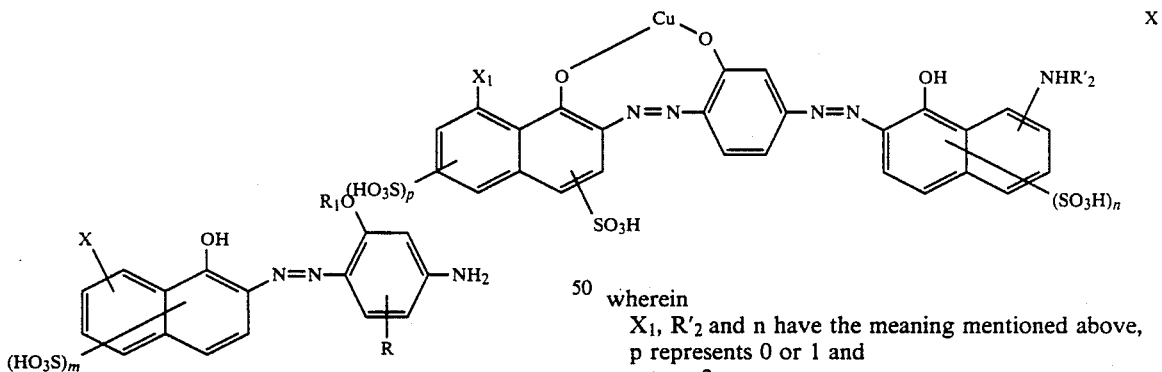
X wherein
$X_1$, $R'_2$ and n have the meaning mentioned above,
p represents 0 or 1 and
n+p=2.

The invention also relates to dyestuffs of the general formulae

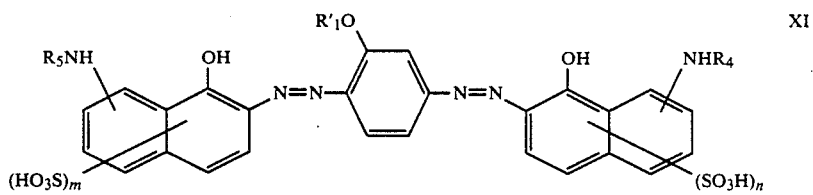
XI and

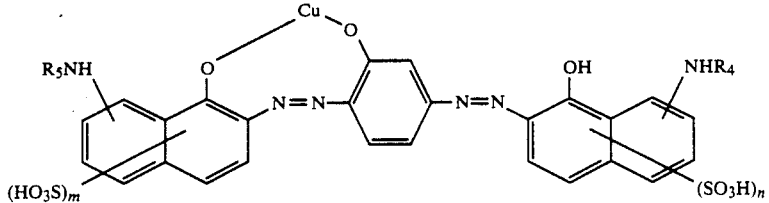

-continued and salts thereof
wherein
$R_4$ and $R_5$ represent hydrogen, acetyl, benzoyl or phenyl and
$R'_1$, m and n have the meaning indicated in the formulae (III) and (IV),
and to processes for dyeing cellulose-containing materials with these dyestuffs.

Dyestuffs of the formula (XI) and (XII) which are preferred are those of the formulae

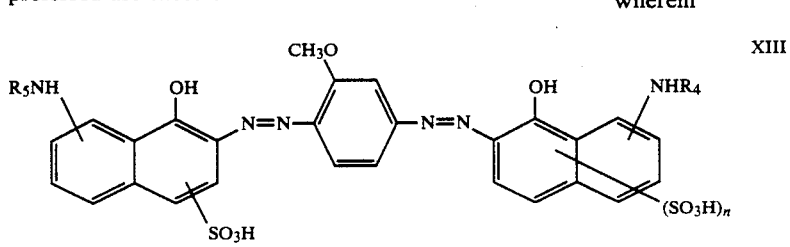

and

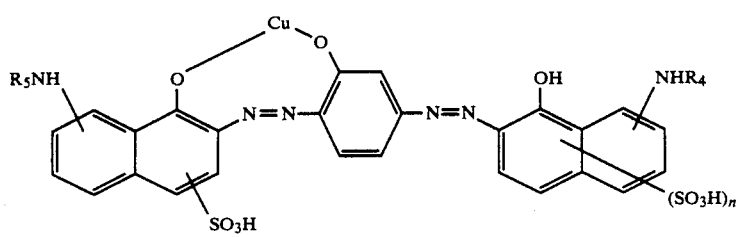

wherein
$R_4$, $R_5$ and n have the meaning mentioned above.

In general, the dyestuffs are employed for dyeing or are put on the market in the form of their salts, in particular the alkali metal salts (Li, Na and K), the ammonium salts and the mono-, bis- or tris-$C_1$-$C_4$-alkylammonium salts, especially the $C_1$-$C_4$-alkanolammonium salts.

Ammonium salts which are preferred in this regard are those containing the cation $$R_6\text{—}N(R_7)_3\overset{(+)}{}$$

wherein
$R_6$ denotes H, $C_1$-$C_4$-alkyl which is optionally substituted by OH or hydroxy-$C_1$-$C_4$-alkoxy, especially $CH_3$, $C_2H_5$, $CH_2$—$CH_2$—OH, $CH_2$-CHOHCH3, $CH_2$—$CH_2$—$OCH_2$—$CH_2$-OH and
$R_7$ denotes $C_1$-$C_4$-hydroxyalkyl or $C_1$-$C_4$-hydroxyalkoxyalkyl, especially $CH_2$—$CH_2$—OH, $CH_2$—CHOHCH3 or $CH_2$—$CH_2$—$OCH_2$—$CH_2$—OH.

The dyestuffs can also be employed in the form of concentrated aqueous solutions.

The compounds of the general formula (VII) are obtained in the manner which is known per se, for example by reducing the compounds of the formula

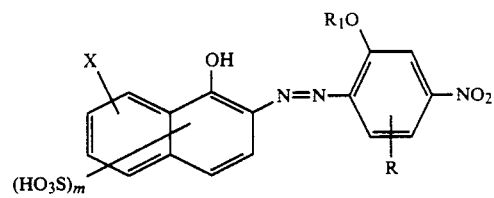

wherein
X, R, $R_1$ and m have the meaning mentioned above, with sodium sulphide or ammonium sulphide.

Compounds of the general formula (XV) are obtained, for example, by coupling diazonium salts obtained from 5-nitro-2-aminophenyl alkyl ethers which are optionally substituted by alkyl or alkoxy with hydroxynaphthalenemonosulphonic and hydroxynaphthalenedisulphonic acids, for example: 4-hydroxynaphthalene-1-sulphonic acid, 5-hydroxynaphthalene-1-sulphonic acid, 4-hydroxynaphthalene-2-sulphonic acid, 4-hydroxynaphthalene-2,7-disulphonic acid, 4-hydroxynaphthalene-1,5-disulphonic acid, 4-hydroxynaphthalene-2,5-disulphonic acid, 5-methoxy-4-hydroxynaphthalene-1-sulphonic acid, 5-ethoxy-4-hydroxynaphthalene-2,7-disulphonic acid and 5-methoxy-4-hydroxynaphthalene-2-sulphonic acid.

The coupling components of the formula (VIII) which are used are aminonaphtholmonosulphonic and aminonaphtholdisulphonic acids, for example: 4-hydroxy-6-aminonaphthalene-2-sulphonic acid, 4-hydroxy-7-aminonaphthalene-2-sulphonic acid, 5-hydroxy-4-aminonaphthalene-1-sulphonic acid, 4-hydroxy-5-aminonaphthalene-2-sulphonic acid, 4-hydroxy-8-aminonaphthalene-2-sulphonic acid, 4-hydroxy-7-aminonaphthalene-1-sulphonic acid, 4-hydroxy-6-aminonaphthalene-1-sulphonic acid, 4- hydroxy-7-aminonaphthalene-1,5-disulphonic acid, 5-hydroxy-2-aminonaphthalene-1,7-disulphonic acid, 5-hydroxy-3-aminonaphthalene-2,7-disulphonic acid, 4-hydroxy-5-aminonaphthalene-2,7-disulphonic acid, 5-hydroxy-4-aminonaphthalene-1,7-disulphonic acid, and 5-hydroxy-4-aminonaphthalene-1,3-disulphonic acid and the N-acetyl and N-benzoyl derivatives thereof; and 4-hydroxy-6-methylaminonaphthalene-2-sulphonic acid, 4-hydroxy-7-methylaminonaphthalene-2-sulphonic acid, 4-hydroxy-6-anilinonaphthalene-2-sulphonic acid, 4-hydroxy-7-anilinonaphthalene-2-sulphonic acid and 4-hydroxy-6-(3-sulphophenylanilinonaphthalene)-2-sulphonic acid.

The compounds of the general formula (VII) can be diazotized in a direct or indirect manner. Coupling is carried out at pH values between 6 and 10, preferably between pH 8 and 9, at temperatures between 0° C. and 30° C.

The acylamino groups NHR₂ and NHR₃ can be converted into the free amino group by known processes.

The conversion, which can be carried out if appropriate, into the copper complexes is effected in a manner known per se, by heating the dyestuffs of the general formula (I) in aqueous solution with copper-II salts, for example copper-II sulphate or copper-II acetate, in the presence of a base, for example an alkanolamine.

The dyestuffs are isolated, for example after the addition of salt, and are dried. It is also possible, however, to pass the coupling solutions or suspensions through a drum dryer or spray dryer.

It is equally possible to prepare concentrated aqueous solutions from the moist pastes of the dyestuffs, for example by subjecting suspensions of these dyestuffs in water to a desalting process, for example by pressure permeation.

Concentrated aqueous solutions of the dyestuffs can also be obtained by isolating the diazonium compounds formed from the compounds of the general formula (VII) and coupling them by means of lithium salts and/or alkanolamines with the coupling components of the general formula (VIII).

The dyestuffs dye cellulose-containing materials, in particular paper, cotton and viscose, and also leather in blue shades having good fastness properties to wet processing and light.

The dyestuffs can be used by all the processes customary for substantive dyestuffs in the paper and textile industries, particularly for dyeing paper for sized and unsized grades in the pulp and on the surface, starting from bleached or unbleached pulp of various origins, such as softwood or hardwood sulphite and/or sulphate pulp. They can also be used in yarn dyeing or piece dyeing of cotton, viscose and linen by the exhaust method from a long liquor or in continuous processes.

In the dyeing of leather, it is preferable to use the dyestuffs as liquid preparations, which are uniformly suitable for spray dyeing and for dyeing in drums and on continuous, multi-purpose machines.

The paper dyeings obtained with the dyestuffs according to the invention are distinguished by good fastness to light and wet processing (fastness to bleeding) and also fastness to acids, alkalies and alum. Mention should also be made of the brilliance and clarity of the colour shades. The combination properties with suitable dyestuffs are also very good.

EXAMPLE 1

65.7 g of the compound of the formula

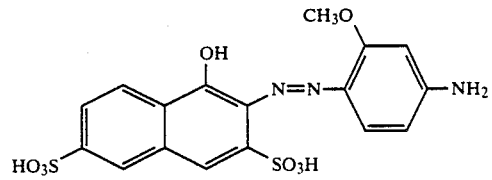

are dissolved in 800 ml of water under neutral conditions, and 10 g of NaNO₂ are added; this solution is added dropwise, at 0° C.–5° C., to a vessel containing 50 ml of concentrated hydrochloric acid and 200 g of ice. 45.7 g of 4-hydroxy-7-anilinonaphthalene-2-sulphonic acid are dissolved in 400 ml of water at 10° C. by means of 8 g of NaOH. The suspension of the diazonium compound is added slowly to this solution, the pH being kept at a value of 9 by adding sodium carbonate solution. The dyestuff is precipitated at 60° C. by adding 240 g of salt and is isolated and dried.

It dyes cotton, staple rayon, paper and leather in blue shades.

EXAMPLE 2

61.2 g of the dyestuff from Example 1 are dissolved in 1000 ml of water at 50° C. A solution of 20 g of copper sulphate ×5 H₂O in 100 ml of water and 40 g of diethanolamine is added to the solution of the dyestuff, and the mixture is then stirred for 5 hours at 95° C. When the coppering is complete, the dyestuff is precipitated by adding 120 g of salt and is isolated and dried.

It dyes cotton, staple rayon, paper and leather in blue shades.

EXAMPLES 3–8

Dyestuffs which dye paper, cotton and viscose in blue shades are also obtained if, instead of the coupling component employed in Example 1, equimolar amounts of 4-hydroxy-7-aminonaphthalene-2-sulphonic acid, 4-hydroxy-6-aminonaphthalene-2-sulphonic acid, 4-hydroxy-7-acetylaminonaphthalene-2-sulphonic acid, 4-hydroxy-6-acetylaminonaphthalene-2-sulphonic acid, 4-hydroxy-7-benzoylaminonaphthalene-2-sulphonic acid or 4-hydroxy-6-benzoylaminonaphthalene-2-sulphonic acid are used.

EXAMPLES 9–14

New copper complex dyestuffs which dye cotton, staple rayon, paper and leather in blue shades are obtained if the dyestuffs from Examples 3–8 are used instead of the dyestuff from Example 1 employed in Example 2.

EXAMPLE 15

75.8 g of the compound of the formula

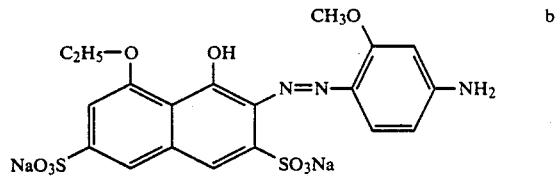

are dissolved in 800 ml of water under neutral conditions; 10 g of NaNO₂ are added, and this solution is added dropwise to a vessel containing 50 ml of concentrated hydrochloric acid and 200 g of ice; 40.7 g of 4-hydroxy-7-acetylaminonaphthalene-2-sulphonic acid are dissolved in 500 ml of water at 10° C. under neutral conditions; the suspension of the diazonium compound is added dropwise slowly to this solution, the pH being kept at a value of 7-7.5 by means of sodium carbonate solution. The dyestuff is precipitated at 60° C. by adding 240 g of salt, and is isolated and dried.

It dyes paper, cotton and viscose in blue shades.

EXAMPLES 16-18

Dyestuffs which dye paper, cotton and leather in blue shades are also obtained if equimolar amounts of 4-hydroxy-7-aminonaphthalene-2-sulphonic acid or its N-phenyl or N-benzoyl derivative are used instead of the coupling component employed in Example 15.

EXAMPLE 19

60.7 g of the dyestuff from Example 15 are dissolved in 1000 ml of water at 50° C. A solution of 20 g of copper-II sulphate ×5 H$_2$O in 100 ml of water and 40 g of diethanolamine is added to this solution; the mixture is then stirred for 8 hours at 95° C. When the coppering is complete, the dyestuff is precipitated by adding 120 g of salt, and is isolated and dried.

It dyes cotton, staple rayon, paper and leather in blue shades.

EXAMPLES 20-22

Copper complex dyestuffs which dye paper, cotton and leather in blue shades are also obtained if the dyestuffs from Examples 16-18 are used instead of the dyestuff employed in Example 19.

EXAMPLE 23

54.1 g of the compound of the formula

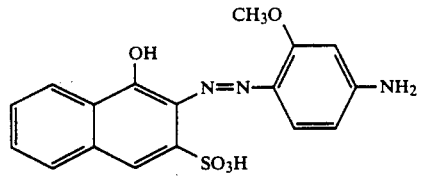
c are dissolved, by means of sodium hydroxide solution, in 1500 ml of water at pH 10; 10 g of NaNO$_2$ are added and the solution is added dropwise to a vessel containing 400 g of ice and 60 ml of concentrated hydrochloric acid. 61.3 g of 7-benzoylamino-4-hydroxynaphthalene-1,5-disulphonic acid are dissolved in 500 ml of water at 10° C. under neutral conditions; the suspension of the diazonium compound is added dropwise slowly to this solution, the pH being kept at a value of 9 by means of sodium carbonate solution. The dyestuff is precipitated at 60° C. by adding 400 g of salt, and is isolated and dried.

It dyes cotton, staple rayon, paper and leather in blue shades.

EXAMPLE 24

65.7 g of compound of the formula

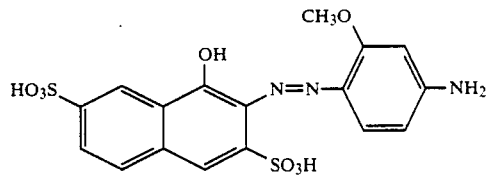
d are dissolved under neutral conditions in 800 ml of water, and 10 g of NaNO$_2$ are added; this solution is added dropwise at 0° C.–50° C. to a vessel containing 50 ml of concentrated hydrochloric acid and 200 g of ice. 45.7 g of 4-hydroxy-7-phenylaminonaphthalene-2-sulphonic acid and 8 g of NaOH are dissolved in 500 ml of water at 10° C. The suspension of the diazonium compound is added slowly to this solution, the pH being kept at a value of 9 by means of sodium carbonate solution. The dyestuff is precipitated at 60° C. by adding 240 g of salt, and is isolated and dried.

It dyes paper, cotton and leather in blue shades.

EXAMPLES 25 and 26

New copper complex dyestuffs which dye cotton, staple rayon, paper and leather in blue shades are also obtained if the dyestuffs from Examples 23 and 24 are used instead of the dyestuff employed in Example 19.

Dyeing Examples

EXAMPLE 1—PRINTING PAPER 800 kg of bleached sulphate cellulose and 200 kg of bleached sulphite cellulose are introduced into a pulper in which 14 cubic meters of production water have previously been placed, and the mixture is battered until it is free from specks. The battering process requires 30 minutes. The battered pulp is then transferred to a dump chest. The pulp suspension from the dump chest is beaten to a freeness of 25°SR (Schopper-Riegler) by means of hollender engines, and then reaches a mixing chest. 250 kg of kaolin Ia (as a filler) and also 1 % of dyestuff, calculated on asolutely dry fibre (in the form of an aqueous solution of 20 g/l) are added in the mixing chest as further additives.

After an exhaustion time of 15 minutes, 2 % of resin size (absolutely dry) are added and, after 10 minutes, 4 % of alum are added (both calculated on absolutely dry cellulose). The pH of the pulp suspension is 5.3. This paper stock passes to the paper-making machine via the process sequence customary in this industry.

EXAMPLE 2—TISSUE PAPER 1000 kg of bleached sulphate cellulose are introduced into a pulper in which 14 cubic meters of production water have previously been placed, and are battered until free from specks. The battering process requires 30 minutes. The battered pulp is then transferred into a stock chest. The pulp from the stock chest is beaten to a freeness of 25°SR by means of hollender engines and then reaches a mixing chest. 1 % of dyestuff, calculated on absolutely dry fibre, in the form of an aqueous solution of 20 g/l, is added in the mixing chest. The pH of the pulp suspension is 7. After an exhaustion time of 15 minutes, this paper stock passes to the paper-making machine via the process sequence customary in this industry.

EXAMPLE 3—SIZE—PRESS APPLICATION 5 kg of dyestuff are dissolved in 1000 liters of a 10 % strength solution of anionic starch and, by means of a sizepress applied to paper. The charge of the solution is 1.5 g/m² absolutely dry per side.

EXAMPLE 4—COTTON YARN

A solution of 0.2 g of sodium carbonate, 4 g of sodium sulphate and 1.5 g of the dyestuff prepared in Example 1 in 250 ml of water is prepared at 40° C. in a dyebath. 10 g of cotton yarn are then kept in constant agitation in the finished dye liquor, the temperature is raised to 95° C. and dyeing is continued for 45 minutes at this temperature. The dyed cotton yarn is then removed from the residual liquor, which has only a slight colour, and residual liquor still adhering is removed by wringing out. The dyed material is then rinsed with cold water and dried at 60° C. A blue dyeing with a good depth of colour and good fastness properties, in particular good fastness to water, washing and perspiration, is obtained.

EXAMPLE 5—LEATHER 100 parts of chrome-tanned calf skin of shaved thickness 0.7 mm which has been re-tanned with synthetic tanning agents are first fulled for 60 minutes in 1000 parts of water and 2 parts of technical ammonia at 50° C. The liquor is drained off and the calf skin is washed with 1000 parts of water at 50° C. and dyed at 50° C. in 500 parts of fresh water and 1 part of a penetrator, using 1 part of the undissolved dyestuff from Example 1. After a dyeing time of 60 minutes, the bath is acidified to pH 3.5 with 1.3 parts of 85% strength formic acid, and the leather is cross-dyed in a new liquor containing 500 parts of water and 0.6 part of the dyestuff. The subsequent fixation with 0.6 part of 85 % strength formic acid is followed by a washing operation, an after-treatment with agents imparting water-repellency and a rinsing operation. A piece of garment leather which has been thoroughly dyed in depth in a blue colour shade is finally obtained after drying, milling and stretching.

EXAMPLE 27

53.2 g of the compound of the formula

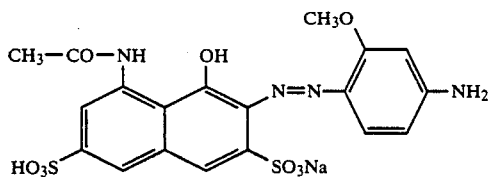

e are dissolved in 800 ml of water under neutral conditions, and 10 g of NaNO2 are added; this solution is added drop-wise at 0°–5° C. to a vessel containing 50 ml of concentrated hydrochloric acid and 200 g of ice. 40.7 g of 4-hydroxy-7-acetylaminonaphthalene-2-sulphonic acid are dissolved under neutral conditions in 500 ml of water at 10° C.; the suspension of the diazonium compound is added dropwise slowly to this solution, the pH being kept at a value of 7–7.5 by means of sodium carbonate solution. The dyestuff is precipitated at 60° C. by adding 240 g of salt, and is isolated and dried.

It dyes paper, cotton and viscose in blue shades.

EXAMPLE 28

The procedure followed is as in Example 27, but, when the coupling is complete and before the product is precipitated and isolated, 64 g of NaOH are added and the mixture is heated at 95° C. for 3 hours, in the course of which the acetyl radicals are split off, giving a dyestuff which dyes cotton, stable rayon, paper and leather in blue shades.

EXAMPLES 29–31

Dyestuffs which dye paper, cotton and leather in blue shades are also obtained if, instead of the coupling component employed in Example 27, equimolar amounts of 4-hydroxy-7-phenylaminonaphthalene-2-sulphonic acid, 4-hydroxy-7-benzoylaminonaphthalene-2-sulphonic acid or 4-hydroxy-6-acetylaminonaphthalene-2-sulphonic acid are used.

EXAMPLE 32

53.2 g of the compound of the formula

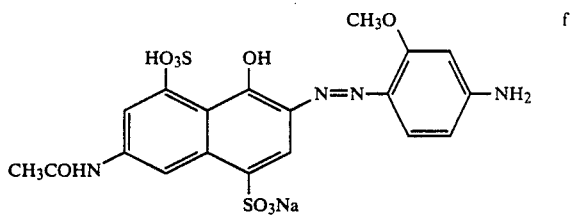

f are dissolved in 800 ml of water under neutral conditions and 10 g of NaNO2 are added; this solution is added dropwise at 0°–5° C. to a vessel containing 50 g of concentrated hydrochloric acid and 200 g of ice. 49.7 g of 4-hydroxy-7-benzoylaminonaphthalene-2-sulphonic acid are suspended in 500 ml of water at 10° C.; the suspension of the diazonium compound is run slowly into this suspension, the pH being kept at a value of 7–7.5 by means of sodium carbonate solution.

The dyestuff dyes paper, cotton and viscose in blue shades.

EXAMPLES 33–37

Dyestuffs which dye paper, cotton and leather in blue shades are also obtained if, instead of the coupling component employed in Example 32, equimolar amounts of 4-hydroxy-7-acetylaminonaphthalene-2-sulphonic acid, 4-hydroxy-7-phenylaminonaphthalene-2-sulphonic acid, 4-hydroxy-6-acetylaminonaphthalene-2-sulphonic acid, 4-hydroxy- 6-benzoylaminonaphthalene-2-sulphonic acid or 4-hydroxy-6-phenylaminonaphthalene-2-sulphonic acid are used.

EXAMPLES 38–40

If the dyestuffs from Examples 31, 33 and 35 are also subjected to alkaline hydrolysis as described in Example 28, dyestuffs which dye cotton, staple rayon, paper and leather in blue shades are obtained.

EXAMPLE 41

46.2 g of the compound of the formula

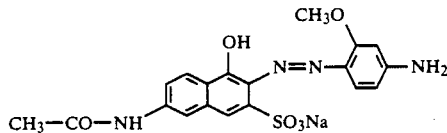

are dissolved in 800 ml of water under neutral conditions and 10 g of NaNO₂ are added; this solution is added dropwise at 0°–5° C. to a vessel containing 50 ml of concentrated hydrochloric acid and 200 g of ice. 34.1 g of monosodium 4-hydroxy-5-aminonaphthalene-2,7-disulphonate are dissolved under neutral conditions in 500 ml of water at 10° C.; the suspension of the diazonium compound is added dropwise to this solution, the pH being kept at a value of 8.5–9 by means of sodium carbonate solution. When the coupling is complete, 64 g of NaOH are added and the mixture is heated at 95° C. for 3 hours, in the course of which the acetyl radical is split off. The solution is neutralized with hydrochloric acid and 350 g of salt are added. The dyestuff which has crystallized out is isolated on a suction filter, and the paste is dissolved in 900 ml of water by means of 40 g of LiOH +H₂O. A solution of a dyestuff which dyes paper, cotton and leather in blue shades is obtained.

EXAMPLE 42

51.4 g of the compound of the formula

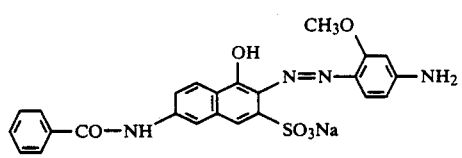

are dissolved in 2000 ml of water under neutral conditions and 10 g of NaNO₂ are added; this solution is added dropwise at 0°–5° C. to a vessel containing 50 ml of concentrated hydrochloric acid and 500 g of ice. 34.1 g of monosodium 4-hydroxy-5-aminonaphthalene-2,7-disulphonate are dissolved under neutral conditions in 500 ml of water at 10° C.; the suspension of the diazonium compound is added dropwise to this solution, the pH being kept at a value of 8.5–9 by means of sodium carbonate solution. The dyestuff is precipitated at 60° C. by adding 450 g of salt and is isolated and dried. It dyes cotton, staple rayon, paper and leather in blue shades.

EXAMPLE 43

A dyestuff which dyes paper, cotton and leather in blue shades is also obtained if equimolar amounts of 5-hydroxy-2-aminonaphthalene-1,7-disulphonate are used instead of 4-hydroxy-5-aminonaphthalene-2,7-disulphonate of example 41.

I claim:

1. A dyestuff of the formula

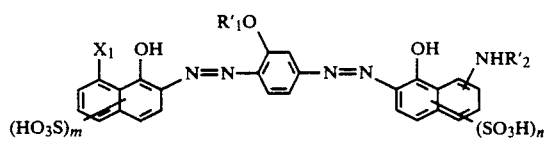

or

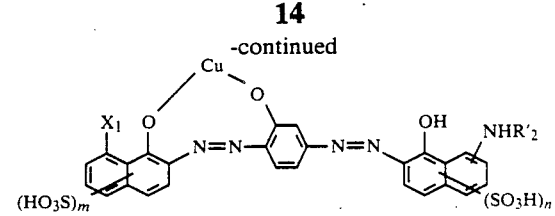

or salts thereof
wherein
$X_1$ denotes hydrogen and
$R'_1$ denotes $C_1$–$C_4$-alkyl,
$R'_2$ denotes hydrogen or phenyl,
and m and n denote 1 or 2, and the sum of m and n is 3.

2. A dyestuff according to claim 1, of the formulae

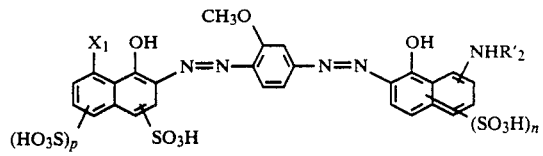

or

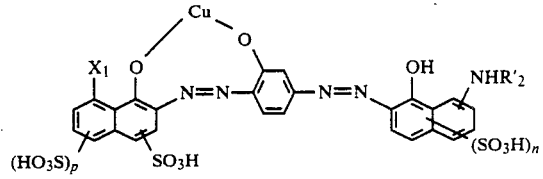

or salts thereof
wherein
p represents 0 or 1 and
n+p is 2.

3. A dyestuff of the formula

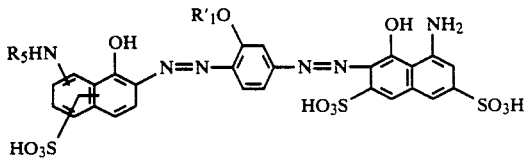

or

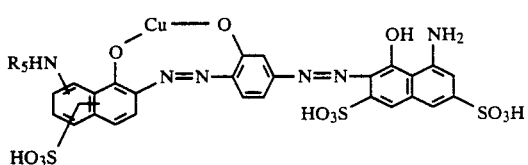

or salts thereof, wherein
$R_5$ represents hydrogen or phenylcarbonyl, and
$R'_1$ denotes $C_1$–$C_4$-alkyl.

4. A dyestuff according to claim 3 of the formulae

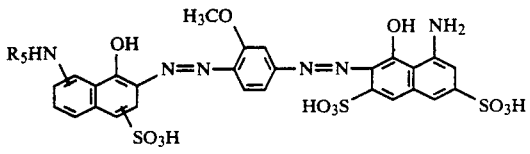

or

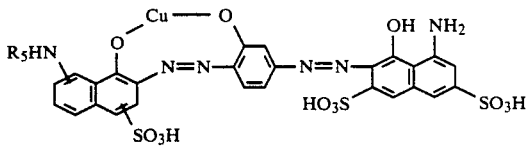

* * * * *